(12) United States Patent
Pazhyannur

(10) Patent No.: US 9,426,729 B2
(45) Date of Patent: Aug. 23, 2016

(54) NETWORK SELECTION FOR MOBILE CLIENT DEVICES IN INTEGRATED CELLULAR AND WI-FI NETWORKS

(71) Applicant: Cisco Technology, Inc., San Jose, CA (US)

(72) Inventor: Rajesh S. Pazhyannur, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 207 days.

(21) Appl. No.: 14/060,137

(22) Filed: Oct. 22, 2013

(65) Prior Publication Data

US 2015/0110089 A1    Apr. 23, 2015

(51) Int. Cl.
*H04L 12/28* (2006.01)
*H04W 48/18* (2009.01)

(52) U.S. Cl.
CPC .................... *H04W 48/18* (2013.01)

(58) Field of Classification Search
CPC ........ H04W 48/18; H04W 12/06; H04W 4/02
USPC ........... 370/229–339, 401; 455/456, 411, 419
See application file for complete search history.

(56) References Cited

U.S. PATENT DOCUMENTS

| | | | | |
|---|---|---|---|---|
| 8,635,335 | B2* | 1/2014 | Raleigh | H04W 36/245 455/456.3 |
| 2011/0237246 | A1* | 9/2011 | Sen | 455/426.1 |
| 2012/0329429 | A1* | 12/2012 | Jabara | G07F 17/3218 455/411 |
| 2015/0056960 | A1* | 2/2015 | Egner | H04W 12/08 455/411 |

FOREIGN PATENT DOCUMENTS

WO    2012084053 A1    6/2012

OTHER PUBLICATIONS

A 3G/LTE Wi-Fi Offload Framework: Connectivity Engine (CnE) to Manage Inter-System Radio Connections and Applications, Qualcomm Incorporated, Jun. 2011, 15 pages.
"Integration of Cellular and Wi-Fi Networks", 4G Americas, Sep. 2013, pp. 1-65.
"Cellular-Wi-Fi Integration A comprehensive analysis of the technology and standardization roadmap", White Paper, InterDigital, Inc., Jun. 2012, pp. 1-26.

* cited by examiner

*Primary Examiner* — Iqbal Zaidi
(74) *Attorney, Agent, or Firm* — Edell, Shapiro & Finnan, LLC

(57) ABSTRACT

Techniques are provided for a network device to receive a first notification message from a first wireless network operating via a first radio frequency protocol, where the notification message indicates a presence of a mobile device within a radio frequency coverage area of a first wireless access point in the first wireless network. A connection message is transmitted from the network device to the mobile device, where the connection message comprises information configured to initiate a connection of the mobile device to a second wireless network operating via a second radio frequency protocol when a radio frequency coverage area of a second wireless access point in the second wireless network is known to overlap the radio frequency coverage area of the first wireless access point in the first wireless network. The connection message may initiate mobile device connections or transfers between, e.g., macrocell, femtocell, and Wi-Fi networks, among other networks.

13 Claims, 6 Drawing Sheets

NETWORK SELECTION FOR MOBILE CLIENT DEVICES IN INTEGRATED CELLULAR AND WI-FI NETWORKS

TECHNICAL FIELD

The present disclosure relates to mobile device network selection.

BACKGROUND

Many mobile device service providers operate integrated networks that integrate macrocell, femtocell, and Wireless Fidelity (Wi-Fi)® networks for voice, video, and data services. Macrocell networks typically provide wireless coverage over much larger geographic areas than femtocell or Wi-Fi networks. For example, Wi-Fi operates according to the Institute of Electrical and Electronics Engineers (IEEE) 802.11 standards and provides coverage in the range of, e.g., 30 to 100 meters. Femtocell or picocell networks typically extend cellular network coverage to areas where it is not economically feasible to provide macrocell coverage, e.g., a small office, a home with poor radio frequency (RF) coverage, or areas that are naturally shielded from RF. In this regard, femtocells typically have a range of 10s of meters, picocells typically have a range less than 200 meters, and macrocells may have a range of approximately one to two kilometers, or more. The macrocell, femtocell, and Wi-Fi networks may operate on different RF bands and via different RF protocols. Wi-Fi networks, on the other hand, may provide these same services using Wi-Fi protocols and Wi-Fi RF bands in lieu of cellular RF frequencies and protocols.

DESCRIPTION OF EXAMPLE EMBODIMENTS

Overview

Techniques are disclosed herein for a network device to receive a first notification message from a first wireless network operating via a first radio frequency protocol, where the notification message indicates a presence of a mobile device within a radio frequency coverage area of a first wireless access point in the first wireless network. A connection message is transmitted from the network device to the mobile device, where the connection message comprises information configured to initiate a connection of the mobile device to a second wireless network operating via a second radio frequency protocol when a radio frequency coverage area of a second wireless access point in the second wireless network substantially overlaps the radio frequency coverage area of the first wireless access point in the first wireless network, and where when the first network operates via the Wi-Fi protocol, the second network operates via the cellular protocol, and when the first network operates via the cellular protocol, the second network operates via the Wi-Fi protocol. Accordingly, the connection message may initiate mobile device connections or transfers between, e.g., macrocell, femtocell, and Wi-Fi networks, among other networks that may become available.

Example Embodiments

Figure 1:
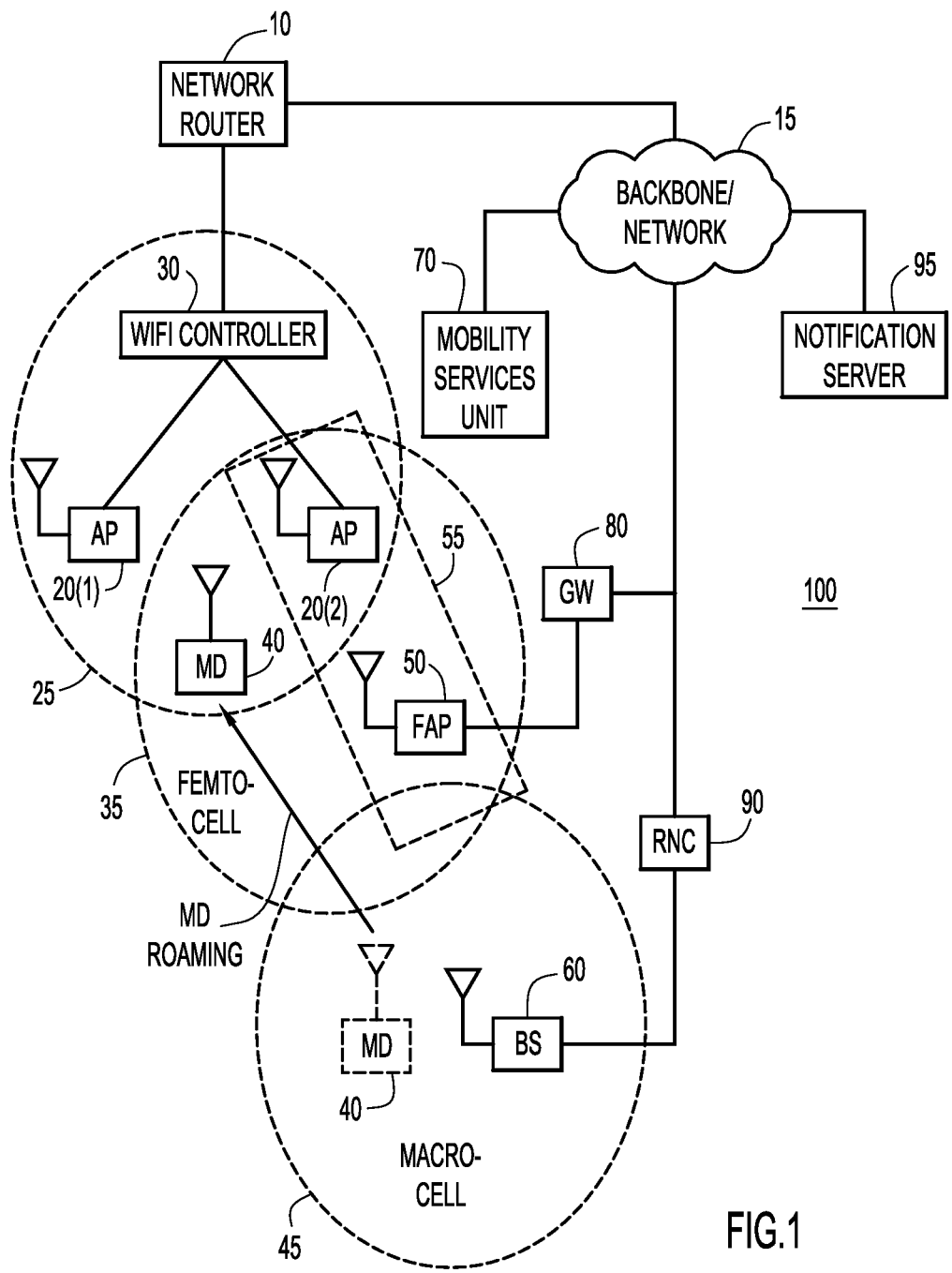
FIG. 1 is a block diagram of a communication network environment in which wireless mobile client devices may roam from one wireless network to another wireless network based on messages provided according to techniques described herein.

Reference is first made to FIG. 1 that shows a block diagram of a networking environment 100 to which the techniques described herein are applicable. FIG. 1 generally depicts a configuration that is common in integrated wireless networks. A network router 10 communicates with a Wi-Fi controller 30 that is further coupled to Wi-Fi Access Points (APs) 20(1) and 20(2). The APs 20(1) and 20(2) provide Wi-Fi coverage in a simplified depiction of a coverage area 25. The network environment further includes a simplified femtocell network coverage area 35 serviced by femtocell access point (FAP) 50 and a simplified macrocell network coverage area 45 serviced by macrocell base station (BS) 60. It should be understood that many other APs, FAPs, and BSs may be included in environment 100 and that coverage areas 25, 35, and 45, do not necessarily conform to the circles or ovals depicted but conform to local topographic, geographic, or other conditions that affect RF propagation.

FAP 50 is serviced and controlled by or via femtocell gateway (GW) 80, and BS 60 is serviced and/or controlled by radio network controller (RNC) 90. Wi-Fi controller 30 (via router 10), GW 80 and RNC 90 are coupled by a backbone or one or more other network(s) 15. Additional network services are provided by a mobility services unit (MSU) 70 and a notification server 95, and are described hereinafter. It should be understood that APs 20 and FAPs, e.g., FAP 50, may form dual-mode access points in which Wi-Fi radios and femtocell radios are housed within a single chassis or otherwise operate in close proximity to each other to provide sufficient overlapping RF coverage area. For example, AP 20(2) and FAP 50 may conform to dual mode operation (i.e., at a single location) or in proximity as indicated by a dashed rectangle indicated by reference numeral 55.

Environment 100 contains at least one mobile device (MD) 40 that is associated with a vehicle or user with the capacity to move between coverage areas 25, 35, and 45. As depicted in FIG. 1, MD 40 can roam, e.g., from macrocell coverage area 45 to various locations including an area currently depicted that lies within both the Wi-Fi coverage area 25 and femtocell coverage area 35. In general, MD 40 and the networks associated with APs 20(1) and 20(2), FAP 50, and BS 60, may not have all the software or capability to optimize services and/or to provide flexibility for user voice and data charges, e.g., legacy devices may be employed.

For example, several problems may arise such as when a user turns off Wi-Fi capability on their mobile device for various reasons such as to conserve battery life on the mobile device. However, when users enter into certain venues, e.g., airports, stadiums, malls, etc., it may be desirable to turn Wi-Fi on automatically (or by way of a user prompt) and potentially even desirable to activate a specific user application relevant to that venue (such as an airport application to provide flight times, a mall application to provide "on sale" items, etc.) In another example, wireless service providers are deploying femtocells within their enterprise network for better coverage, increased capacity, etc. In many cases the enterprise femtocells use a frequency that is different from the frequency in the surrounding or neighboring macrocell, and the mobile device does not know when or if to switch to femtocell operation (or Wi-Fi operation).

In many cases, client devices do not handover from macrocell to femtocell operation (or Wi-Fi) even when they are close to the femtocell station. This behavior may occur because the client does not scan for cells in a requisite frequency band or using a different protocol if the signal strength of a connected AP or macrocell base-station is above a certain threshold. As a result, client devices may continue to remain connected to the macrocell base station (or other station). Given the presence of a femto, the service providers may desire the mobile device to transfer to the femtocell (rather than remain connected to the macrocell), or connect to a Wi-Fi AP. The techniques described herein provide a simple "push" mechanism that pushes a mobile device to a desired network, whether femtocell, macrocell, Wi-Fi, or other network or access point.

While there are some available roaming technologies, e.g., 3GPP, Mobility Services Access Protocol (MSAP), access network and discovery function (ANDSF) these protocols or technologies do not address efficiencies that may be obtained when certain geographic radio frequency coverage areas overlap or substantially overlap. In this regard, when MD 40 migrates or roams from macrocell 45 to coverage in either Wi-Fi coverage area 25 or femtocell coverage area 35 (as shown in FIG. 1), the network may benefit by informing MD 40 to switch to AP 20(2) or FAP 50, e.g., by way of a message. MD 40 may need to receive such a message when in the Wi-Fi coverage area 25 or femtocell coverage area 35 because the signal strength from BS 60 may be strong enough that MD 40 does not deem it necessary to "look" for other RF connections.

In order to facilitate such messaging, notification server 95 registers with the femto GW 80 and mobility services unit 70. Mobility services unit 70 monitors activity of mobile devices with respect to Wi-Fi networks, e.g., by coordinating with Wi-Fi controller 30. Similarly, GW 80 knows of subscribers operating within attached femtocells. When a mobile device enters a coverage area, e.g., MD 40 after roaming, the mobile device may connect with AP 20(2) or may register with FAP 50. After connection or registration occurs, the notification server 95 receives a message from the corresponding network. The notification server 95 has knowledge of certain network topologies and placement of network infrastructure devices in network 100. It should be understood, the notification server 95 embodies the functions or methods enabled by the techniques described herein and these techniques may be embodied in any device in network 100, e.g., as software module or encoded logic, and may act as a client or server with respect to messaging, or may be embodied as a virtual machine in virtualized or cloud computing environments.

For example, if MD 40 connects to AP 20(2), but does not register with FAP 50, the notification server may know that AP 20(2) and FAP 50 operate in proximity to each other or are part of a dual-mode AP 55 in which AP 20(2) and FAP 50 could be collocated in the same chassis. In this situation, the notification server 95 may send a message to MD 40. If MD 40 is connected to AP 20(1), notification server 95 may send a message to MD 40 to connect to FAP 50. On the other hand, if MD 40 has registered with FAP 50, notification server 95 may send a message to MD 40 to connect to AP 20(2). Further details of these techniques are described in connection with the remaining figures in the text below.

Figure 2:
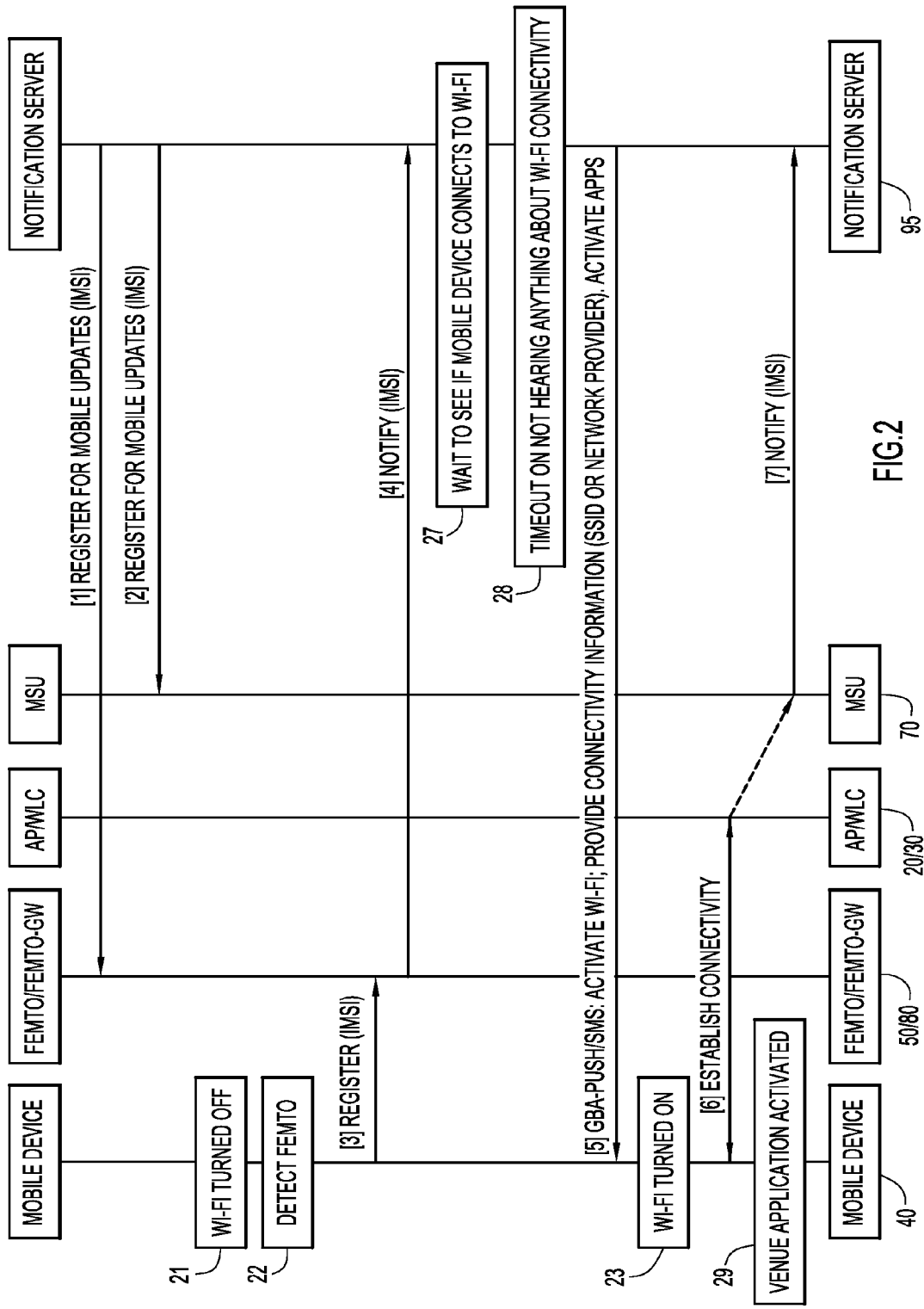
FIG. 2 is a ladder diagram illustrating a first example messaging scheme that is configured to trigger a connection of a mobile device with a Wi-Fi network according to techniques described herein.

Referring to FIG. 2, a ladder diagram illustrating a first example messaging scheme that is configured to trigger a connection of a mobile device with a Wi-Fi network is described. In this example, a mobile device, e.g., MD 40, roams into a venue or Wi-Fi coverage area, e.g., Wi-Fi coverage area 25 (which has an overlapping RF coverage area with femtocell coverage area 35). For numerous reasons the mobile device may not automatically connect to AP 20(2). For example, the MD's Wi-Fi radio may be turned off (to conserve battery life) or may be connected to another Wi-Fi AP. As a preliminary condition, at reference numeral 1, notification server 95 has registered with the either femtocell 50 and/or femto cell GW 80 in order to receive registration notifications when MDs register with respective femtocells. At 2, notification server 95 has registered with mobility services unit 70 in order to receive connection notifications when MDs connect or attempt to connect with respective Wi-Fi APs. Notification server 95 uses an identifier for a given subscriber or MD such as an International Mobile Subscriber Identity (IMSI). Accordingly, when an MD associated with the registered IMSI makes a network change, registration, or connection, notification server 95 receives a notification of the MD's network operations from the associated Wi-Fi or cellular network.

In one example, MD 40 has entered into a Wi-Fi coverage area, e.g., area 25, with its Wi-Fi radio turned off as indicated at reference numeral 21. At 22, at some point in time, MD 40 detects an FAP, e.g., FAP 50, and at 3, registers with FAP 50. At 4, FAP 50 or GW 80 sends a notification message to notification server 95. Thus, for example, when an MD initiates network activity or responds to network commands, notification server 95 receives corresponding MD activity messages that may be identified by an assigned identifier, e.g., the IMSI for MD 40. Optionally, at 27, notification server waits for a predetermined period of time, and at 28, a timeout occurs after the predetermined period time. Regardless of the optional timeout features described with respect to reference numerals 27 and 28, at 5, notification server 95 sends an activate message to MD 40 comprising information configured to prompt, notify, or otherwise command the MD 40 to establish connectivity with a Wi-Fi access point, e.g., AP 20(2). The activate message may comprise a Generic Bootstrapping Architecture (GBA) push/Short Message Service (SMS) message. It should be noted that any of the messages described herein may comprise an identifier, e.g., a username or other identifier, which identifies either the MD or the user associated with the MD. In every cellular network a mobile subscriber is identified by way of an IMSI that is defined by standards or other industry agreements.

In response to the activate message, MD 40 turns on its Wi-Fi radio. When the MD's Wi-Fi radio is turned on it may search for Wi-Fi networks and APs. In one embodiment, the activate message sent at 5, contains information configured to enable the MD to connect to a Wi-Fi network. For example, the activate message may include a service set identifier (SSID), AP frequency, and/or other information that allows the MD to connect to a particular Wi-Fi network or an individual Wi-Fi AP, e.g., AP 20(2). At 23, the MD turns its Wi-Fi on, and at 6, handshaking messages are exchanged between MD 40 and AP 20(2) in order to establish a connection there between. Once connectivity has been established, at 7, MSU 70 optionally sends a notify message to notification server 95 to complete any messaging handshakes. It is to be understood that since MSU 70 monitors or controls aspects of connectivity in a Wi-Fi network, that there is an implied connection, and in general, regular communication between WLC 30 and MSU 70. This is indicated in FIG. 2 by way of a dashed connection line between reference numerals 6 and 7.

At this point, the MD has the desired connectivity, i.e., whether macrocell, femtocell, Wi-Fi, or other current or potential RF network, and at any coverage area granularity enabled by the techniques described herein. In addition to prompting the MD to connect to a particular network, the activate message (or a separate message) may contain an optional application identifier (ID). As a subscriber roams into a particular venue, e.g., an airport or sports arena/stadium, the user may desire to have both Wi-Fi access and application activation for that venue. By way of example, the user may desire flight arrival and departure times, among other airport information; or in a sports related venue, ticket prices, seat availability, sports statistics, etc., that may be enable by particular applications running on the user's MD. The application ID in the activate message allows the MD to launch the identified application for the benefit of the user. Application activation is indicated at reference numeral 29. Permissions to connect to Wi-Fi or launch any identified application may be enabled by user pre-configuration or by a prompt provided to the user by the MD.

Figure 3:
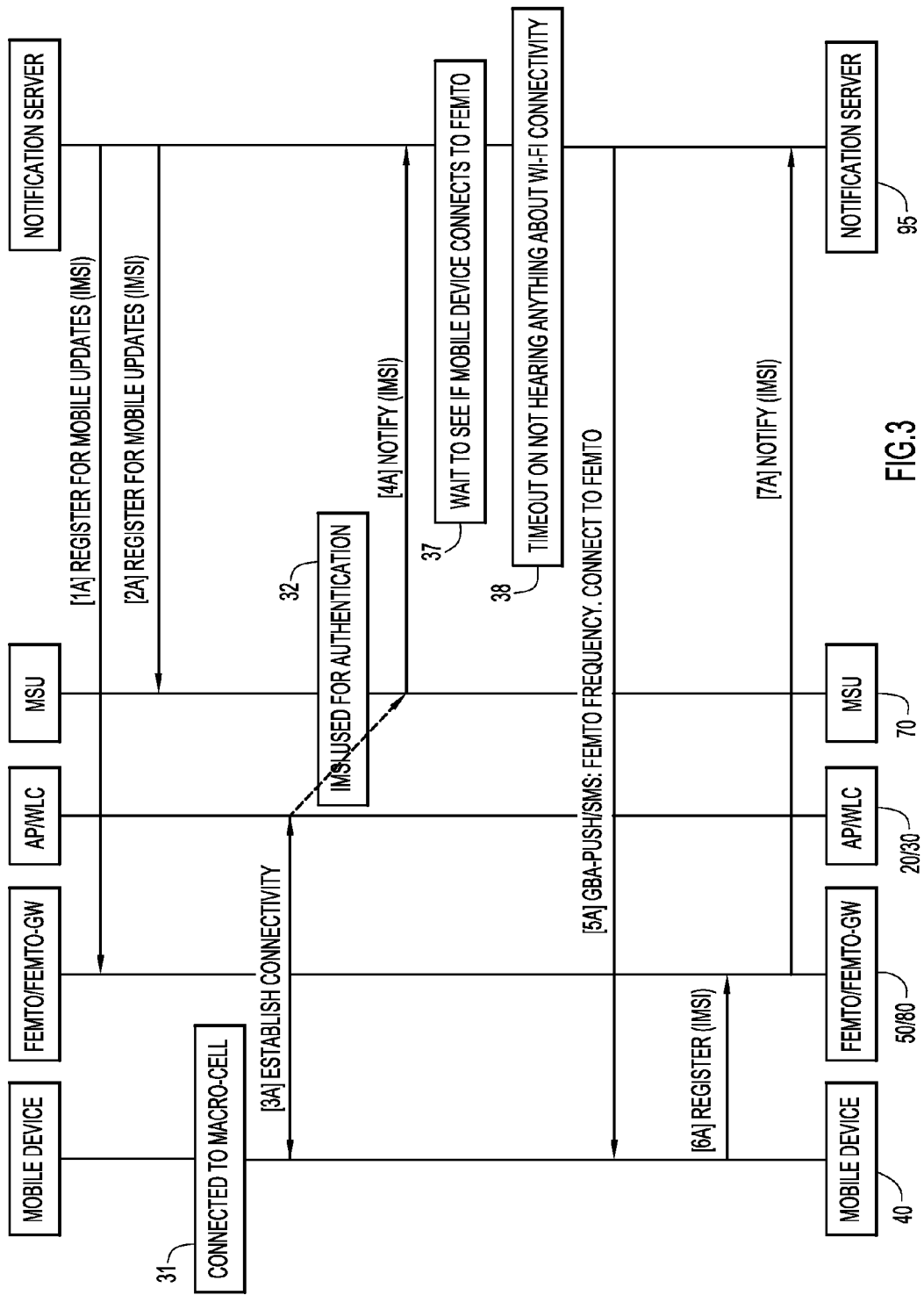
FIG. 3 is a ladder diagram illustrating a second example messaging scheme that is configured to trigger a connection of the mobile device with a femtocell network according to techniques described herein.

In a separate or coordinated process, an MD, e.g., MD 40, is prompted to connect to a cellular network by way of a similar prompt or activate message from server 95. Referring now to FIG. 3, a ladder diagram illustrating a second example messaging scheme that is configured to trigger a connection of the mobile device with a femtocell or other cellular network is now described.

In this example, a mobile device, e.g., MD 40, roams into a femtocell coverage area, e.g., femtocell coverage area 35, which has an overlapping or substantially overlapping RF coverage area with Wi-Fi coverage area 25. For numerous reasons the mobile device may not automatically connect to FAP 50, e.g., the MD may be occupied with an otherwise good macrocell connection (i.e., the MD has no need to "look" for a better connection), e.g., as indicated at reference numeral 31. As a preliminary condition, at reference numeral 1A, notification server 95 has registered with either femtocell 50 and/or femto cell GW 80 in order to receive registration notifications when MDs register with respective femtocells, and at 2A, notification server 95 has registered with mobility services unit 70 in order to receive connection notifications when MDs connects or attempts to connect with respective Wi-Fi APs. Notification server 95 may register for notifications using an identifier, e.g., an IMSI, as described above.

In one example, MD 40 has entered into a femtocell coverage area, e.g., area 35, without attempting a registration with a femtocell AP, e.g., FAP 50. At 3A, at some point, MD 40 establishes connectivity with a Wi-Fi AP, e.g., AP 20(2). At 4A, MSU 70 sends a notification message to notification server 95. As described in connection with FIG. 2, it is to be understood that there is an implied connection, and in general, regular communication between WLC 30 and MSU 70. This is indicated in FIG. 3 by way of a dashed connection line between references 3A and 4A. At 32, the IMSI or other ID may be used for message authentication.

Once the notify message is sent at 4A, optionally, at 37, the notification server may wait for a predetermined period of time, and at 38, a timeout occurs after the predetermined period time. Regardless of the optional timeout features described with respect to reference numerals 37 and 38, at 5A, notification server 95 sends a connect message to MD 40 comprising information configured to prompt, notify, or otherwise command the MD 40 to register with a femtocell access point, e.g., FAP 50.

In response to the connect message, MD 40 connects to a designated femtocell or searches a designated frequency, or range of frequencies. When a femtocell has been acquired by the MD, at 6A, the MD registers (or handshake messages are exchanged) with FAP 50 in order to register and/or "park" the MD on the cellular network. Once registration has been achieved, at 7A, femtocell 50 and/or GW 80, optionally sends a notify message to notification server 95 to complete any messaging cycle or handshakes.

At this point, the MD has the desired RF network connectivity, i.e., whether macrocell, femtocell, Wi-Fi, other current cell types, at any potential level RF network cell size granularity enabled by the techniques described herein. The techniques described herein provide simplified mechanism for initiating network connectivity that does not rely on complex location services that employ either triangulation, multilateration, or satellite based geolocation, e.g., Global Positioning System (GPS) geolocation. To further illustrate, overlapping RF coverage areas between Wi-Fi and femtocell APs allow for one network that detects an MD to initiate a connection by the MD with another network that operates by way of a different frequency band and/or RF protocol.

The overlapping RF coverage areas indicate a level of proximity of Wi-Fi APs and FAPs, or that they a collocated, and as such, one network can be used to prompt a connection to the other network. In this regard, coverage areas may be considered to overlap or substantially overlap for a number of reasons such as AP proximity, RF topographic modeling or simulation, site surveys, or other techniques.

Figure 4:
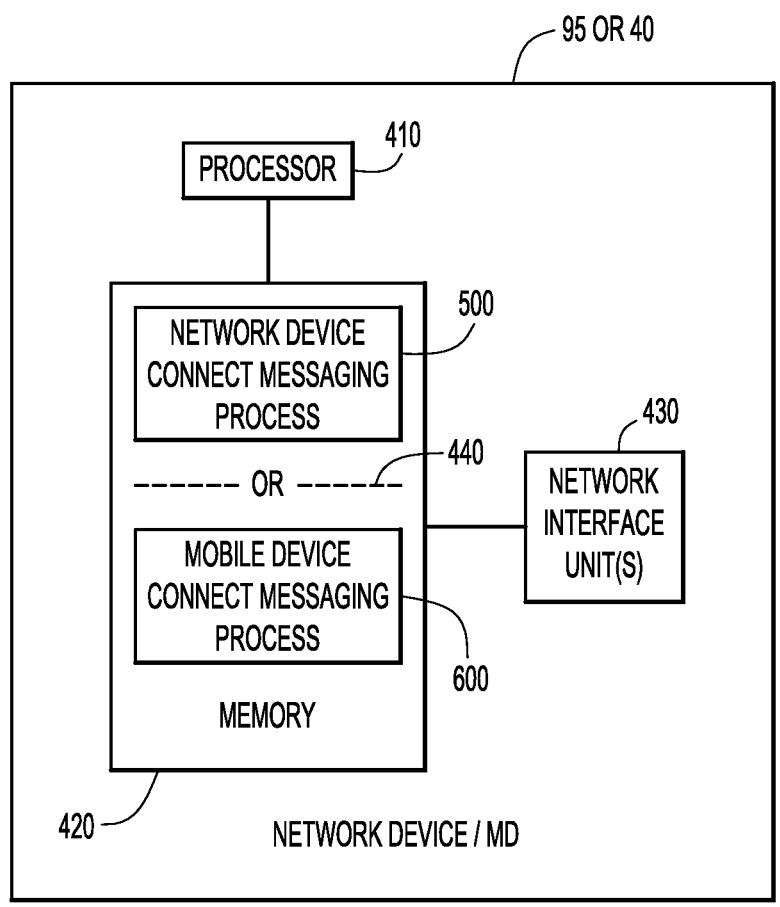
FIG. 4 is a block diagram of a generic device that is configured as a notification server to transmit messages configured to switch mobile devices between wireless networks or configured to act as mobile device when receiving such switch messages according to techniques described herein.

Referring now to FIG. 4, a block diagram is shown that is meant to represent an example of a block diagram of a generic network device that is configured with at least one of the processes described herein. For example, the generic network device may represent the notification server 95 or MD 40, which are configured to perform the processes that facilitate the MD network transfer techniques described herein. The network device comprises a processor 410, one or more network interface units 430, and a memory 420. The processor 410 is for example, a microprocessor, a microcontroller, a digital signal processor, etc., that may employ fixed or programmable logic including field programmable gate arrays (FPGAs) and or application specific integrated circuits (ASICs). The network interface unit 430 is a device that is configured to enable communications over a wired or wireless network according to any of a variety of networking protocols. It is to be understood that numerous other components may be present within the generic network device 95/40, such as antennas, digital and analog signal conversion devices, receivers, transmitters, and the like.

For ease of illustration, the device shown in FIG. 4 is configured with a network device connect messaging process 500 when acting as an attached network device such as notification server 95. Process 500 receives notification messages from various RF networks operating at various wireless frequencies and or protocols indicating a presence of an MD, e.g., MD 40, within a given RF network, and sends a connect message to the MD in order to make the MD aware of other potential RF networks. The connect message comprises information that allows or commands the MD to make network connection choices. For example, messaging process 500 may command an MD detected or present in one network to connect to another network, such that when connected to a Wi-Fi network, the MD connects to a femtocell network; or when connected to a macrocell network, the MD connects to a Wi-Fi network; or any other MD network connection possibilities enabled by the techniques described herein.

When acting as an MD, such as MD 40, the device shown in FIG. 4 is configured with a mobile device connect messaging process 600. Process 600 receives connect messages from the notification server 95 in order to become aware of other potential RF networks. The connect message comprises information that allows or commands the MD to make network connection choices. For example, messaging process 600 may command an MD to connect to a Wi-Fi network, a femtocell network, or a macrocell network. Whether or not the generic network device is acting as an MD or as a notification server is conceptually illustrated by a dashed line at reference numeral 440. It is to be understood that processes 500 and 600 are encoded or otherwise enabled within respective devices depicted in FIGS. 1-3.

The memory 420 is a tangible processor readable or computer readable storage media (e.g., memory device) that stores or is encoded with instructions that, when executed by the processor 410, cause the processor 410 to perform functions described herein. The memory 420 may comprise read only memory (ROM), random access memory (RAM), magnetic disk storage media devices, optical storage media devices, flash memory devices, electrical, optical, or other physical/tangible memory storage devices. The processor 410 is, for example, a microprocessor or microcontroller that executes instructions stored in memory 420. Thus, in general, the memory 420 may comprise one or more computer readable storage media (e.g., a memory device) encoded with software comprising computer executable instructions and when the software is executed (by the processor 410) it is operable to perform the operations described herein. For example, the memory 420 is encoded with instructions for one of processes 500 or 600. The process 500 is generally described hereinafter in connection with FIG. 5 and process 600 is generally described hereinafter in connection with FIG. 6.

Figure 5:
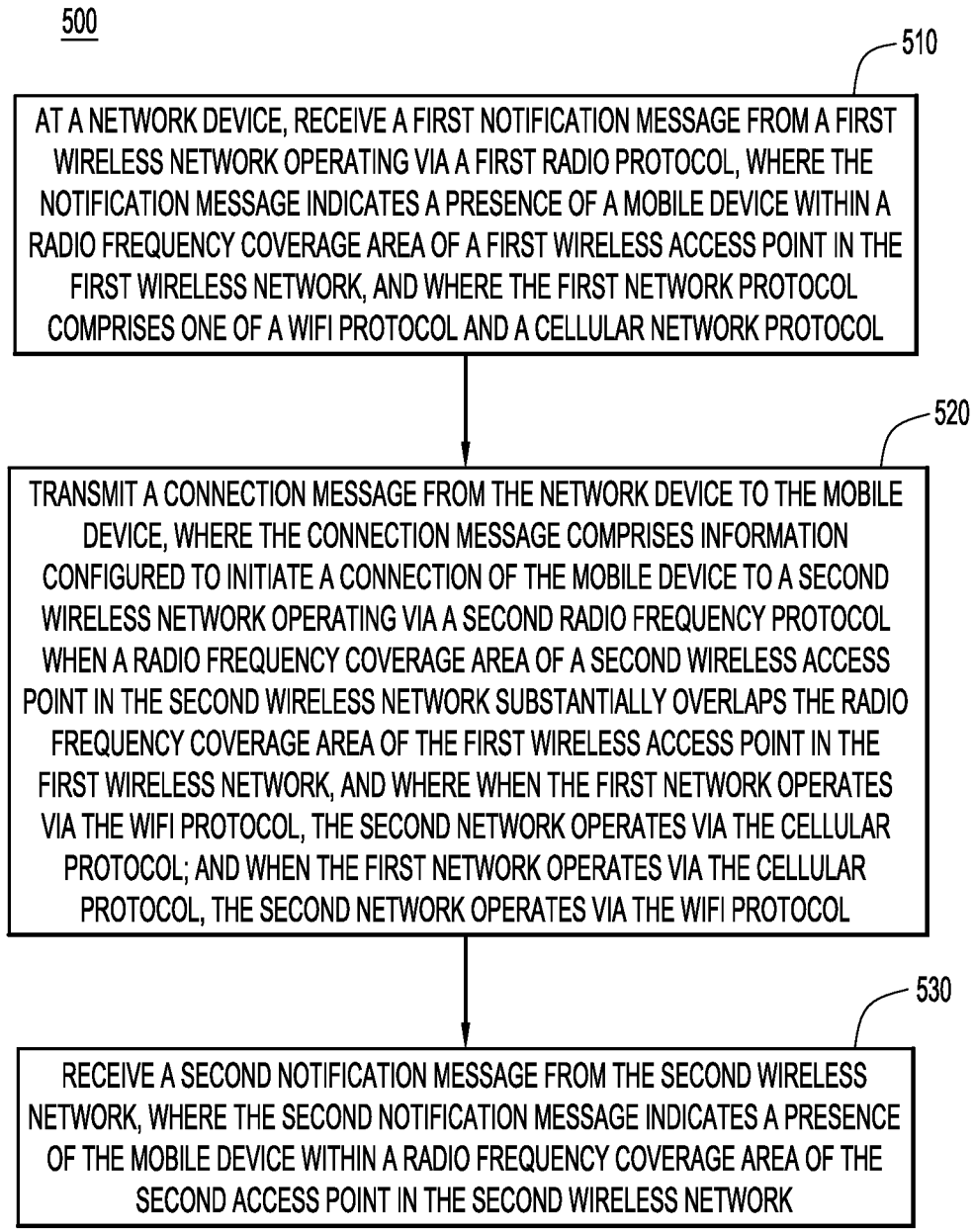
FIG. 5 is a flow chart depicting a generalized network switching process managed by a network device for initiating a connection of a mobile device to a second wireless network when in the presence of a first wireless network.

Referring to FIG. 5, a flow chart is described for network device connect messaging process 500. At 510, at a network device, a first notification message is received from a first wireless network operating via a first radio frequency protocol, where the notification message indicates a presence of a mobile device within a radio frequency coverage area of a first wireless access point in the first wireless network, and where the first network protocol comprises one of a Wi-Fi protocol and a cellular network protocol. At 520, a connection message is transmitted from the network device to the mobile device, where the connection message comprises information configured to initiate a connection of the mobile device to a second wireless network operating via a second radio frequency protocol when a radio frequency coverage area of a second wireless access point in the second wireless network overlaps, substantially overlaps, or is known to overlap, the radio frequency coverage area of the first wireless access point in the first wireless network, and where when the first network operates via the Wi-Fi protocol, the second network operates via the cellular protocol, and when the first network operates via the cellular protocol, the second network operates via the Wi-Fi protocol. At 530, and optionally, a second notification message is received from the second wireless network, where the second notification message indicates a presence of the mobile device within a radio frequency coverage area of the second wireless access point in the second wireless network. This second message may close a messaging loop or finish any handshaking that may result from transmitting the connect message. In other words, the second message indicates that the mobile device has responded to information contained in the connect message.

In addition, the notification server may wait for a predetermined period of time prior to transmitting the connection message so as to give the MD time to connect to the second wireless network without prompting from the notification server. The first wireless network may comprise one of a cellular network and a Wi-Fi network operating via the first radio frequency protocol and the second wireless network may comprise one of a cellular network and a Wi-Fi network operating via the second radio frequency protocol. In another example, the first wireless access point and the second wireless access point are collocated.

The connection message may comprise one of a Generic Authentication Architecture (GAA) message, a GBA message, SMS message, a message based on a protocol in use for the first wireless network, and an out-of-band message. For example, a Hypertext Transfer Protocol (HTTP) connection message may be sent. The connection message comprises one or more of parameters associated with the second wireless network, e.g., an SSID, an indication of available frequencies in the second wireless network, and an indication of an application to be started on the mobile device, e.g., an application index or name.

The notification server registers with network servicing devices, e.g., WLCs, MSUs, GWs, etc., in each of the first and second wireless networks in order to receive notification messages from each of the first and second wireless networks configured to indicate the presence of the mobile device within the respective first or second wireless network. The notification server may receive a second notification message from the second wireless network, where the second notification message indicates a presence of the mobile device within a radio frequency coverage area of the second wireless access point in the second wireless network. In other words, the MD has responded to the connection message.

Figure 6:
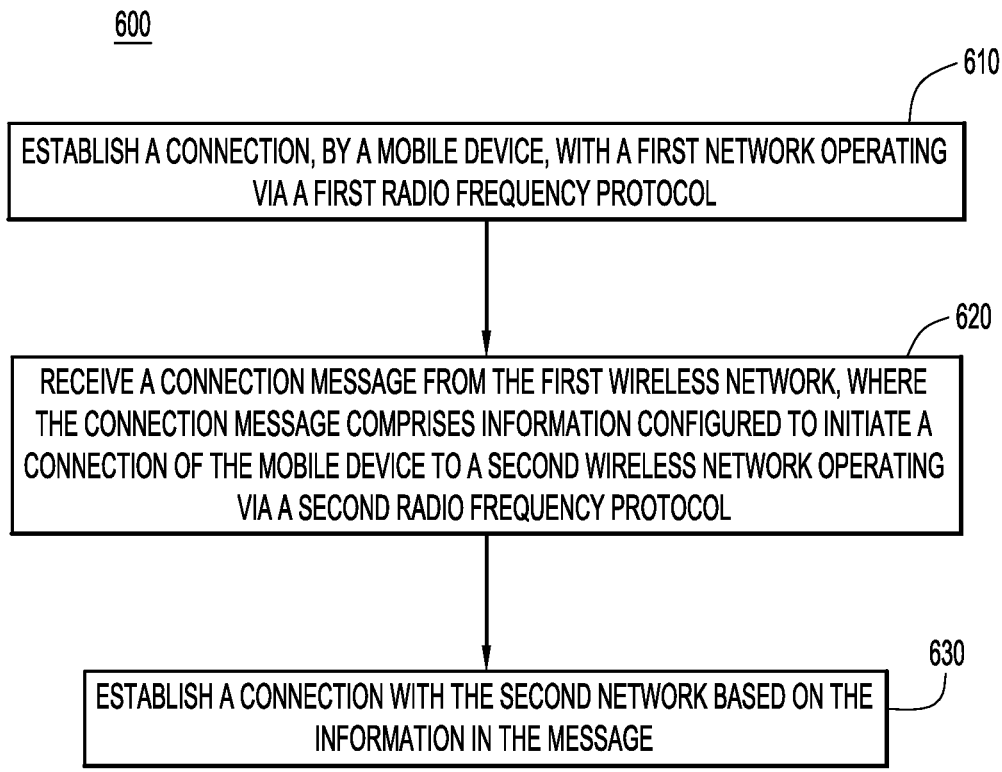
FIG. 6 is a flow chart depicting a generalized network switching process employed by a mobile device for switching the mobile device between wireless networks based on messages received from the network device.

Turning now to FIG. 6, a flow chart is described for mobile device connect messaging process 600. At 610, a connection is established by a mobile device, e.g., MD 40, with a first network operating via a first radio frequency protocol. In lieu of an actual connection, the MD may register or otherwise indicate its presence in the first network. At 620, the MD receives a connection message, e.g., via the first wireless network or from the notification server 95, where the connection message comprises information configured to initiate a connection of the mobile device to a second wireless network operating via a second radio frequency protocol. At 630, the MD establishes a connection with the second network based on the information in the message. The MD may also activate an application when indicated by the information in the connection message.

In summary, techniques are described herein for a network device to receive a first notification message from a first wireless network operating via a first radio frequency protocol, where the notification message indicates a presence of a mobile device within a radio frequency coverage area of a first wireless access point in the first wireless network. A connection message is transmitted from the network device to the mobile device, where the connection message comprises information configured to initiate a connection of the mobile device to a second wireless network operating via a second radio frequency protocol when a radio frequency coverage area of a second wireless access point in the second wireless network substantially overlaps the radio frequency coverage area of the first wireless access point in the first wireless network, and where when the first network operates via the Wi-Fi protocol, the second network operates via the cellular protocol, and when the first network operates via the cellular protocol, the second network operates via the Wi-Fi protocol. Accordingly, the connection message may initiate mobile device connections or transfers between, e.g., macrocell, femtocell, and Wi-Fi networks, among other networks that may become available.

The techniques described herein provide several advantages. For example, prior techniques have relied on obtaining location via GPS or a cell tower approximation of the location of the MD, and GPS location or location approximation are uses suggest a choice of Wi-Fi AP. These prior techniques have the limitations, e.g., GPS can be inaccurate, especially indoors, and consume excess power on the MD. Furthermore, in many cases Wi-Fi may not be turned on. The techniques described herein do not use GPS, but rather use the registration to a cellular radio, e.g., in a dual-mode AP to detect the availability of Wi-Fi and signal to the mobile device using the connected radio, or when a Wi-Fi connection has been established, to signal a femtocell or macrocell connection.

Although the techniques are illustrated and described herein as embodied in one or more specific examples, it is nevertheless not intended to be limited to the details shown, since various modifications and structural changes may be made therein without departing from the scope of the and range of equivalents of the claims.

What is claimed is:

1. A method comprising:
   at a network device, receiving a first notification message from a first wireless network operating via a first radio frequency protocol, wherein the notification message indicates a presence of a mobile device within a radio frequency coverage area of a first wireless access point in the first wireless network, and wherein the first network protocol comprises one of a Wireless Fidelity (Wi-Fi) protocol and a cellular network protocol;
   and transmitting a connection message from the network device to the mobile device, wherein the connection message comprises information configured to initiate a connection of the mobile device to a second wireless network operating via a second radio frequency protocol when a radio frequency coverage area of a second wireless access point in the second wireless network substantially overlaps the radio frequency coverage area of the first wireless access point in the first wireless network, and wherein when the first network operates via the Wi-Fi protocol, the second network operates via the cellular protocol, and when the first network operates via the cellular protocol, the second network operates via the Wi-Fi protocol; and
   waiting a predetermined period of time prior to transmitting the connection message, wherein the connection message is configured to activate a user application on the mobile device relevant to a venue at which the mobile device is located, and
   wherein the connection message comprises one or more of parameters associated with the second wireless network, an indication of available frequencies in the second wireless network, and an indication of the user application to be started on the mobile device.

2. The method of claim 1, wherein the first wireless network operates via a first radio frequency band associated with the first network and the second wireless network operates via a second radio frequency band associated with the second network.

3. The method of claim 1, wherein the first wireless access point and the second wireless access point are collocated.

4. The method of claim 1, wherein the connection message comprises one of a Generic Authentication Architecture (GAA) message, a Generic Bootstrapping Architecture (GBA) message, a Short Message Service (SMS) message, a message based on a messaging protocol available in the first wireless network, and an out-of-band message.

5. The method of claim 1, further comprising registering with network servicing devices in each of the first and second wireless networks in order to receive notification messages from each of the first and second wireless networks configured to indicate the presence of the mobile device within the respective first or second wireless network.

6. The method of claim 1, further comprising receiving a second notification message from the second wireless network, wherein the second notification message indicates a presence of the mobile device within a radio frequency coverage area of the second wireless access point in the second wireless network.

7. The method of claim 1, further comprising:
   at the mobile device, receiving the connection message; and establishing a connection by the mobile device with the second wireless network based on the information in the connection message.

8. An apparatus comprising:
   a network interface configured to send and receive messages over a wired and/or wireless network;
   a processor in communication with a memory and configured to:
   receive, via the network interface unit, a first notification message from a first wireless network operating via a first radio frequency protocol, wherein the notification message indicates a presence of a mobile device within a radio frequency coverage area of a first wireless access point in the first wireless network, and wherein the first network protocol comprises one of a Wireless Fidelity (Wi-Fi) protocol and a cellular network protocol;
   transmit a connection message to the mobile device, wherein the connection message comprises information configured to initiate a connection of the mobile device to a second wireless network operating via a second radio frequency protocol when a radio frequency coverage area of a second wireless access point in the second wireless network substantially overlaps the radio frequency coverage area of the first wireless access point in the first wireless network, and wherein when the first network operates via the Wi-Fi protocol, the second network operates via the cellular protocol, and when the first network operates via the cellular protocol, the second network operates via the Wi-Fi protocol; and
   wait a predetermined period of time prior to transmitting the connection message, wherein the connection message is configured to activate a user application on the mobile device relevant to a venue at which the mobile device is located; and
   wherein the processor is configured to transmit the connection message comprising one or more of parameters associated with the second wireless network, an indication of available frequencies in the second wireless network, and an indication of the user application to be started on the mobile device.

9. The apparatus of claim 8, wherein the processor is configured to transmit the connection message comprising one of a Generic Authentication Architecture (GAA) message, a Generic Bootstrapping Architecture (GBA) message, a Short Message Service (SMS) message, a message based on a protocol in use for the first wireless network, and an out-of-band message.

10. The apparatus of claim 8, wherein the processor is further configured to register with network servicing devices in each of the first and second wireless networks in order to receive notification messages from each of the first and second wireless networks configured to indicate the presence of the mobile device within the respective first or second wireless network.

11. The apparatus of claim 8, wherein the processor is further configured to receive a second notification message from the second wireless network, wherein the second notification message indicates a presence of the mobile device within a radio frequency coverage area of the second wireless access point in the second wireless network, and wherein the second wireless network comprises one of a cellular network and a Wi-Fi network operating via the second radio frequency protocol.

12. A system comprising the apparatus of claim 8 and the mobile device, wherein the mobile device is configured to:
  receive the connection message; and
  establish a connection by the mobile device with the second wireless network based on the information in the connection message.

13. One or more computer readable non-transitory storage media encoded with software instructions that when executed are operable to:
  receive, via a network interface, a first notification message from a first wireless network operating via a first radio frequency protocol, wherein the notification message indicates a presence of a mobile device within a radio frequency coverage area of a first wireless access point in the first wireless network, and wherein the first network protocol comprises one of a Wireless Fidelity (Wi-Fi) protocol and a cellular network protocol;
  transmit a connection message to the mobile device, wherein the connection message comprises information configured to initiate a connection of the mobile device to a second wireless network operating via a second radio frequency protocol when a radio frequency coverage area of a second wireless access point in the second wireless network substantially overlaps the radio frequency coverage area of the first wireless access point in the first wireless network, wherein when the first network operates via the Wi-Fi protocol, the second network operates via the cellular protocol, and when the first network operates via the cellular protocol, the second network operates via the Wi-Fi protocol; and
  wait a predetermined period of time prior to transmitting the connection message,
wherein the connection message is configured to activate a user application on the mobile device relevant to a venue at which the mobile device is located~
wherein the instructions that transmit comprises instructions to transmit the connection message comprising: one or more of parameters associated with the second wireless network, an indication of available frequencies in the second wireless network, and an indication of the user application to be started on the mobile device.

* * * * *